United States Patent [19]
Husa et al.

[11] 3,783,911
[45] Jan. 8, 1974

[54] METHOD FOR SAFELY COLLECTING HYDROCARBON VAPORS PRESENT DURING LOADING OR UNLOADING OF FLAMMABLE FUELS

[75] Inventors: Howard W. Husa, Park Forest; Irwin Ginsburgh, Morton Grove, both of Ill.

[73] Assignee: Standard Oil Company, Chicago, Ill.

[22] Filed: July 28, 1972

[21] Appl. No.: 276,132

[52] U.S. Cl. ............................. 141/11, 220/85 VR
[51] Int. Cl. .............................................. B65b 1/30
[58] Field of Search ............... 141/1, 11, 52, 59; 220/85 S, 85 VR; 55/88; 73/23

[56] References Cited
UNITED STATES PATENTS
2,853,149  9/1958  Gosselin .................... 220/85 VR X
2,965,196  12/1960  Rich, Jr. ........................ 141/11 X Primary Examiner—Edward L. Roberts
Attorney—Arthur G. Gilkes et al.

[57] ABSTRACT

Disclosed is a method for collecting hydrocarbon vapors before they are dispersed in the atmosphere surrounding a site where loading or unloading of flammable fuels occur. The collected vapors are monitored to determine when the air-hydrocarbon vapor mixture is near or in the combustible range. When it is determined that the mixture is near or in the combustible range, a hydrocarbon gas such as propane is injected into the mixture to remove the danger of explosion or fire. The collected vapors are held in a holding tank and, preferably, are periodically burned.

3 Claims, 1 Drawing Figure

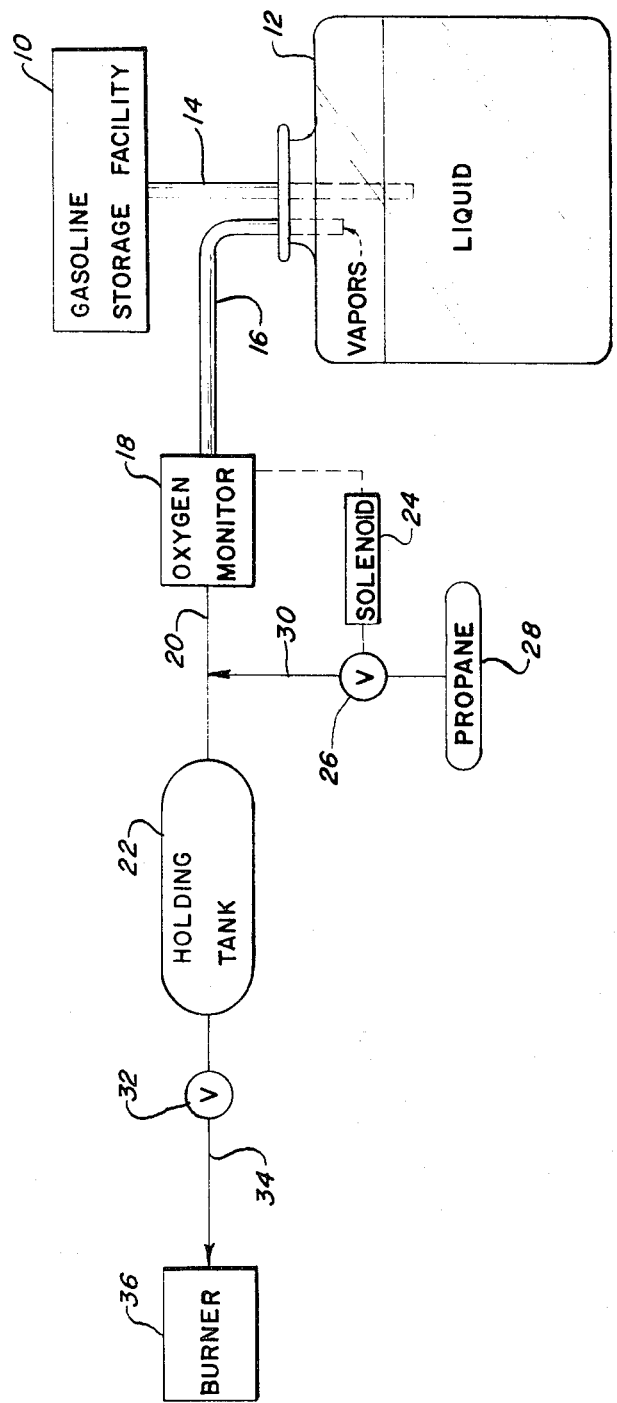

METHOD FOR SAFELY COLLECTING HYDROCARBON VAPORS PRESENT DURING LOADING OR UNLOADING OF FLAMMABLE FUELS

BACKGROUND

Avoiding environment pollution is a major concern of the oil industry. Transferring of gasoline from storage facilities to tank trucks, railroad cars, barges, etc. can be a source of environmental pollution if hydrocarbon vapors are allowed to disperse in the atomsphere surrounding the loading-unloading area. The objective of the present invention is to provide a safe method for collecting hydrocarbon vapors present during the loading or unloading of such flammable fuels as gasoline. The problem encountered in collecting such hydrocarbon vapors is to avoid a dangerous situation where the hydrocarbon vapors would be mixed with air at concentrations which would lead to a flammable or combustible mixture. For most ambient temperatures a concentration of light hydrocarbon vapors within the range of from about 1.5 to about 8.5 volume percent in air is a flammable mixture and must therefore be avoided.

THE INVENTION

In accordance with our invention, hydrocarbon vapors present during loading or unloading of flammable fuels are collected before they are dispersed in the atmosphere, and these collected vapors are monitored to determine when the air-hydrocarbon vapor mixture is near or in the combustible range. In response to a determination that the air-hydrocarbon vapor mixture is near or in the combustible range, hydrocarbon gas from a second source is injected into this mixture. Enough gas is injected to remove the danger that the mixture will be combustible. The preferred gases are propane, butane, ethane or methane. This noncombustible mixture is forwarded to a collection zone where it is held until such time as it is burned or otherwise safely disposed of.

DESCRIPTION OF PREFERRED EMBODIMENT

The FIGURE schematically illustrates our invention where hydrocarbon vapors present during loading or unloading of flammable fuels are safely collected.

Gasoline from storage facility 10 is introduced into a tank truck, railroad car or other transportation means 12. A conventional dual coupling is employed where gasoline liquid flows into transportation means 12 through intake line 14. Means 12 is filled with liquid and the hydrocarbon vapors escape through line 16. These hydrocarbon vapors flow through oxygen monitor 18 and line 20 into holding tank 22. Oxygen monitor 18 is a conventional device sold by Beckman Instruments. Alternately, an infrared instrument gas density instrument, thermal conductivity instrument, or flame ionization instrument may be used to monitor hydrocarbon concentration.

Monitor 18 analyzes the hydrocarbon vapors to determine the oxygen concentration in these vapors. The control circuit of monitor 18 includes a relay (not shown) which is actuated when the air-hydrocarbon vapor mixture flowing through the monitor approaches the combustible range. This relay actuates solenoid 24 which in turn opens valve 26 in line 30. With valve 26 open, propane gas stored under pressure in tank 28 flows through line 30. This propane gas flows at essentially a constant rate and mingles with the air-hydrocarbon vapor mixture flowing through line 20. Flow rates are controlled so that the amount of propane gas introduced into the air-hydrocarbon vapor mixture is adequate to remove the danger that the mixture flowing into holding tank 22 is near the combustible range. So long as the stream of air and hydrocarbon vapor flowing into monitor 18 is approaching the combustible range, solenoid 24 will remain open. When this stream is well within the noncombustible range, the relay is deactuated, shutting off solenoid 24 and closing valve 26.

Periodically, valve 32 in line 34 is opened and the vapors in holding tank 22 are discharged into burner 36 where they are burned under nonhazardous conditions.

We claim:

1. A method of safely collecting hydrocarbon vapors present during loading or unloading of flammable fuels, comprising
    a. collecting said vapors before they are dispersed in the atmosphere surrounding the loading-unloading area,
    b. monitoring the hydrocarbon concentration in said collected vapors to determine when the air-hydrocarbon vapor mixture is near or in the combustible range,
    c. in response to a determination that the air-hydrocarbon vapor mixture is near or in the combustible range, from a second source injecting a hydrocarbon gas into the air-hydrocarbon vapor mixture to form a noncombustible mixture, and
    d. forwarding this noncombustible mixture to a collection zone.

2. The method of claim 1 wherein the noncombustible mixture in the collection zone is periodically forwarded to a burner where such mixture is burned under nonhazardous conditions.

3. The method of claim 1 wherein the hydrocarbon gas injected into the air-hydrocarbon vapor mixture is propane, butane, ethane, methane, or any mixture thereof.

* * * * *